US012530994B2

(12) United States Patent
Andersson Lonnstrom

(10) Patent No.: US 12,530,994 B2
(45) Date of Patent: Jan. 20, 2026

(54) COLOUR AFTERGLOWING SIGN

(71) Applicant: SYSTEMTEXT AB, Malmo (SE)

(72) Inventor: Mikael Andersson Lonnstrom, Skanor (SE)

(73) Assignee: SYSTEMTEXT AB, Malmo (SE)

( * ) Notice: Subject to any disclaimer, the term of this patent is extended or adjusted under 35 U.S.C. 154(b) by 160 days.

(21) Appl. No.: 18/281,616

(22) PCT Filed: Mar. 24, 2022

(86) PCT No.: PCT/SE2022/050282
§ 371 (c)(1),
(2) Date: Sep. 12, 2023

(87) PCT Pub. No.: WO2022/203582
PCT Pub. Date: Sep. 29, 2022

(65) Prior Publication Data

US 2024/0169865 A1 May 23, 2024

(30) Foreign Application Priority Data

Mar. 25, 2021 (SE) .................................... 2150349-5
Mar. 25, 2021 (SE) .................................... 2150350-3

(51) Int. Cl.
*G09F 13/20* (2006.01)

(52) U.S. Cl.
CPC .................................... *G09F 13/20* (2013.01)

(58) Field of Classification Search
CPC ............................. G09F 13/20; G09F 2013/05
See application file for complete search history.

(56) References Cited

U.S. PATENT DOCUMENTS 3,780,462 A * 12/1973 Pregel .................. C09K 11/565 40/544
5,009,019 A * 4/1991 Erlendsson ............. G09F 13/20 40/543

(Continued)

FOREIGN PATENT DOCUMENTS

CA 2512259 A1 1/2007
CN 1938741 A 3/2007

(Continued)

OTHER PUBLICATIONS

International Search Report & Written Opinion for Application No. PCT/SE2022/050282 dated Apr. 19, 2022.

(Continued)

*Primary Examiner* — Gary C Hoge
(74) *Attorney, Agent, or Firm* — MOSER TABOADA

(57) ABSTRACT

The present invention describes a colour afterglowing product, said colour afterglowing product being printed with a colour afterglowing layer comprising colour afterglowing pigment(s), wherein the colour afterglowing product comprises symbols and/or text in one first afterglowing colour and a complementing signal field with a colour afterglowing layer in a different second afterglowing colour, where the complementing signal field with a colour afterglowing layer in a second afterglowing colour has a luminance of 4/0.5 mcd/$m^2$ when measured in accordance with ISO 16069:2017 testing parameters and at 10/60 minutes, preferably a minimum luminance of 6/0.75 mcd/$m^2$, most preferably a minimum luminance of 7.5/1.0 mcd/$m^2$, when measured in accordance with ISO 16069:2017 testing parameters and at 10/60 minutes.

21 Claims, 4 Drawing Sheets

(56) References Cited

U.S. PATENT DOCUMENTS

| | | | | |
|---|---|---|---|---|
| 5,172,937 | A * | 12/1992 | Sachetti | B44F 1/02<br>250/462.1 |
| 2004/0055483 | A1* | 3/2004 | Thollin | G09F 13/20<br>101/35 |
| 2005/0198879 | A1* | 9/2005 | Hannington | G09F 13/20<br>40/542 |
| 2007/0193090 | A1* | 8/2007 | Thollin | G09F 13/20<br>40/546 |
| 2019/0259313 | A1* | 8/2019 | Green | G09F 13/08 |
| 2020/0242979 | A1* | 7/2020 | Zhou | G09F 13/20 |
| 2022/0198970 | A1* | 6/2022 | O'Kell | G09F 13/20 |

FOREIGN PATENT DOCUMENTS

| | | | |
|---|---|---|---|
| EP | 0812896 | A1 | 12/1997 |
| EP | 2717245 | A2 | 4/2014 |
| SE | 536008 | C2 | 3/2013 |
| WO | WO-020/67230 | A1 | 8/2002 |
| WO | WO-2005/106827 | A1 | 11/2005 |
| WO | WO-2008/097151 | A1 | 8/2008 |

OTHER PUBLICATIONS

Extended European Search Report for Application No. 22776231.7 dated Mar. 5, 2025, 11 pages.

* cited by examiner

COLOUR AFTERGLOWING SIGN

FIELD OF THE INVENTION

The present invention relates to a colour afterglowing product, especially to a colour afterglowing sign.

TECHNICAL BACKGROUND

There are known afterglowing products on the market today. One such in the form of a sign is disclosed in EP1368799. EP1368799 describes an afterglowing sign printed with afterglowing pigments, in which the afterglowing pigments are supplemented by at least a partial screen print using opaque or transparent ink. Moreover, in EP1741081 there is disclosed an afterglowing sign with a sign material having a coloured surface, wherein the coloured surface of the sign is provided by printing with opaque ink on the sign material, where a ground colour of the sign is provided by printing an opaque ink and symbols and borders by printing another opaque ink on the sign material, and where the opaque ink of the ground colour and the another opaque ink of the symbols and borders are non-afterglowing, wherein the afterglowing sign also comprises a transparent print of afterglowing pigments and wherein the coloured surface of the sign shines through the transparent print with afterglowing pigments. Furthermore, in EP2717245 there is disclosed a colour afterglowing article comprising an afterglowing material, wherein the colour afterglowing article comprises a colour print of a non-afterglowing colour system, wherein the colour print has a colour value being less than 100% for each chosen colour of the colour system, when calculated in the colour system CMYK, wherein the colour print is a digital print, wherein the afterglowing material is free from colour pigments, and wherein the colour afterglowing article afterglows in the colours chosen in the colour system.

One aim of the present invention is to provide a colour afterglowing product which provides optimal colour reproduction in both daylight and in the dark.

SUMMARY OF THE INVENTION

The stated purpose above is achieved by a colour afterglowing product, said colour afterglowing product being printed with a colour afterglowing layer comprising colour afterglowing pigment(s), wherein the colour afterglowing product comprises symbols and/or text in one first afterglowing colour and a complementing signal field with a colour afterglowing layer in a different second afterglowing colour, wherein the complementing signal field with a colour afterglowing layer in a second afterglowing colour has a minimum luminance of 4/0.5 mcd/$m^2$ when measured in accordance with ISO 16069:2017 testing parameters and at 10/60 minutes, preferably a minimum luminance of 6/0.75 mcd/$m^2$, most preferably a minimum luminance of 7.5/1.0 mcd/$m^2$, when measured in accordance with ISO 16069:2017 testing parameters and at 10/60 minutes.

The present invention provides colour afterglowing products, such as signs, which provides an optimal effect of colour reproduction in daylight as well as in the dark. This is obtained by providing a high luminance effect of the signal field from the colour afterglowing material, but still with the correct colour effect in daylight.

According to the present invention, the optimal colour reproduction in the dark is obtained by providing both the colour afterglowing part of the sign with a high enough luminance as well as a suitable luminance level of the non-coloured afterglowing part, i.e. the white/yellowish afterglowing symbols and/or text (afterglowing with a white colour). As will become clear from above, the present invention provides an optimal sign for the colour reproduction in the dark, e.g. by proving an optimal range of the luminance of the white/yellowish afterglowing symbols and/or text so that this part does not affect the perceived colour afterglowing signal field in a negative way.

The present invention provides an optimization for the colour reproduction in both daytime and in the dark. There are several signs etc. providing either of the two, but the present invention provides optimal colour reproduction both in daylight as well as in the dark. Moreover, also the colour effect in the dark with reference to interaction between non-coloured afterglowing symbols and/or text and the colour afterglowing signal field. The combined effect of the two different colour afterglowing spaces of e.g. a sign interact to ensure an optimal effect in the dark. This also implies that a too high level of luminance of the white/yellowish symbol could affect the reproduction of the colour of the signal field in the dark in a somewhat negative way.

As mentioned, also the colour reproduction in daytime should be in the right colour. This may be obtained by using different means. As notable from below, one way is via the right level of fluorescent pigments in the colour afterglowing signal field. Furthermore, a colour afterglowing product according to the present invention may also comprise a screen pattern, such as a line or dot screen pattern printed on top of the colour afterglowing signal field.

SPECIFIC EMBODIMENTS OF THE INVENTION

Figure 1:
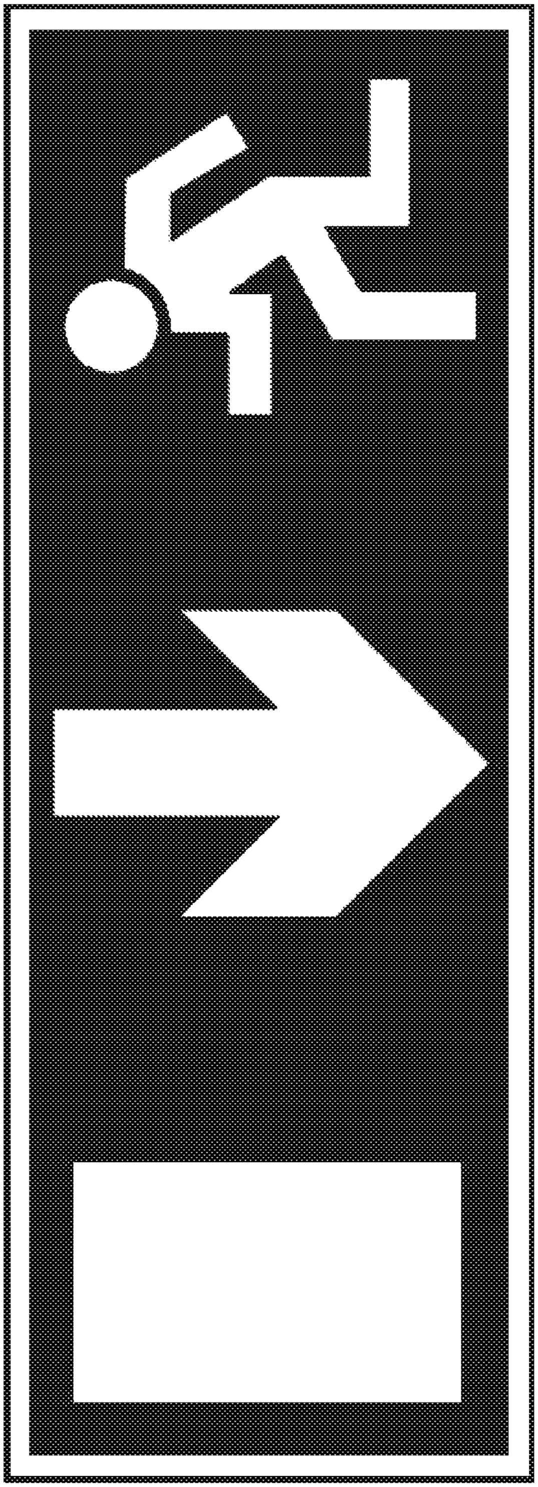
FIG. 1 shows a schematic view of a possible escape route sign according to one embodiment of the present invention.

Below there are provide further embodiments of the present invention.

As hinted above, also the luminance of the white/yellow (uncoloured) afterglowing symbols are important, also for the entire effect of the colour afterglowing product according to the present invention. According to one embodiment of the present invention, the symbols and/or text in one first afterglowing colour comprises white/yellowish afterglowing pigments (material) and has a minimum luminance of 140/20 mcd/$m^2$, preferably a minimum luminance of 160/20 mcd/$m^2$, more preferably a minimum luminance of 190/25 mcd/$m^2$, most preferably a luminance in the range of (190/25-350/50) mcd/$m^2$, when measured in accordance with ISO 16069:2017 testing parameters and at 10/60 minutes. The most preferred range also with a maximum luminance is provided as a too high luminance in the non-coloured afterglowing material may have a negative effect on the colour afterglowing of the signal field.

Furthermore, the colour afterglowing product according to the present invention also provides the correct colour reproduction in daylight. As said, also the colour in daylight is of importance. The present invention provides products, such as signs, which also meets the suitable standards for colour reproduction of totally non-coloured afterglowing signs. In line with this, according to one embodiment, the complementing signal field with a colour afterglowing layer in a second afterglowing colour has a colour corresponding to the standard ISO 3864-4:2011 with reference to chromaticity coordinates and luminance factor for object colours of ordinary materials, phosphorescent materials and unpowered internally illuminated safety signs under external illumination, for the specific chosen colour(s) of the complementing signal field, preferably being a green or a red colour.

Furthermore, the present invention provides optimal combinations of the features provided above, especially in relation to certain colours of great interest, such as green or red colours, e.g. in relation to safety signs. Therefore, according to one embodiment of the present invention, the complementing signal field with a colour afterglowing layer in a second afterglowing colour has a minimum luminance of 7.5/1.0 mcd/$m^2$, when measured in accordance with ISO 16069:2017 testing parameters and at 10/60 minutes, and has a red colour, preferably a red colour corresponding to the standard ISO 3864-4:2011 with reference to chromaticity coordinates and luminance factor for object colours of ordinary materials, phosphorescent materials and unpowered internally illuminated safety signs under external illumination. This embodiment is directed towards obtaining a high colour luminance as well as a correct red colour reproduction also in daylight.

Furthermore, according to yet another embodiment, the complementing signal field with a colour afterglowing layer in a second afterglowing colour has a minimum luminance of 15/2.0 mcd/$m^2$, preferably a minimum luminance of 25/3.0 mcd/$m^2$ when measured in accordance with ISO 16069:2017 testing parameters and at 10/60 minutes, and has a green colour, preferably a green colour corresponding to the standard ISO 3864-4:2011 with reference to chromaticity coordinates and luminance factor for object colours of ordinary materials, phosphorescent materials and unpowered internally illuminated safety signs under external illumination. As should be understood, this embodiment is directed towards a green afterglowing signal field with a correct green colour also in daylight.

The differences in obtainable luminance levels with reference to green vs red are shown also in the testing examples below.

A combined preferred embodiment according to the present invention is directed to a colour afterglowing product, wherein the complementing signal field with a colour afterglowing layer in a second afterglowing colour has a minimum luminance of 4/0.5 mcd/$m^2$ when measured in accordance with ISO 16069:2017 testing parameters and at 10/60 minutes, preferably a minimum luminance of 6/0.75 mcd/$m^2$, most preferably a minimum luminance of 7.5/1.0 mcd/$m^2$, when measured in accordance with ISO 16069:2017 testing parameters and at 10/60 minutes, and wherein the symbols and/or text in one first afterglowing colour comprises white/yellowish afterglowing pigments and has a minimum luminance of 140/20 mcd/$m^2$, preferably a minimum luminance of 160/20 mcd/$m^2$, more preferably a minimum luminance of 190/25 mcd/$m^2$, most preferably a luminance in the range of (190/25-350/50) mcd/$m^2$, when measured in accordance with ISO 16069:2017 testing parameters and at 10/60 minutes.

Again, the most preferred range also with a maximum luminance for the non-coloured afterglowing material is provided as a too high luminance in the non-coloured afterglowing material may have a negative effect on the colour afterglowing of the signal field.

Furthermore, also the amount level of the phosphorescent pigment(s) may be of relevance according to the present invention. According to one embodiment of the present invention, the amount of phosphorescent pigment(s) is in the range of 30-80 wt. %, preferably in the range of 40-70 wt. %, more preferably in the range of 45-65 wt. %, calculated on the total weight of colour in the colour afterglowing layer. According to yet another embodiment, the colour afterglowing layer of the signal field also comprises fluorescent pigment(s).

The level of the phosphorescent pigment(s) should be much higher than the amount level of fluorescent pigment(s), as the phosphorescent pigment(s) ensures for a high degree of colour afterglowing in the dark. As should be understood from above, according to one embodiment, the colour afterglowing layer of the complementing signal field comprises both phosphorescent pigment(s) and fluorescent pigment(s). According to yet another embodiment, the amount of fluorescent pigment(s) in the colour afterglowing layer of the complementing signal field is below 1.5 wt. %, preferably in the range of 0.5-1.5 wt. %, calculated on the total weight of colour in the colour afterglowing layer. As hinted above, this low level of fluorescent pigments according to the present invention ensures that the phosphorescent pigment(s) are dominant, which is important to provide for colour afterglowing in the dark. Furthermore, the inclusion of fluorescent pigment(s) is still very relevant as this ensures a clearer colour in daylight, thus optimally in the range of 0.5-1.5 wt. %.

An even lower level of fluorescent pigment(s) may also be possible as the colour afterglowing layer may be complemented with a printed screen pattern in a non-afterglowing colour according to the present invention.

Based on the above, according to one embodiment, the complementing signal field with a colour afterglowing layer in a different second afterglowing colour is complemented with a coloured screen pattern with non-afterglowing colour complementing the second afterglowing colour, preferably so that the complementing signal field has a colour corresponding to the standard ISO 3864-4:2011 with reference to chromaticity coordinates and luminance factor for object colours of ordinary materials, phosphorescent materials and unpowered internally illuminated safety signs under external illumination, for the specific chosen colour(s) of the complementing signal field, preferably being a green or a red colour.

Such a combination provides for a clear colour in daylight as well as a strong colour reproduction in the dark. Moreover, by use a screen pattern less fluorescent pigment(s) are needed in the colour afterglowing layer, which in turn is beneficial in terms of the total need of special pigments in a product according to the present invention.

When incorporating a screen pattern, this may be applied in different forms. According to one embodiment, the screen pattern is a coloured line screen pattern and/or a coloured dot screen pattern. It should be noted that all possible combinations here are possible according to the present invention. One example is a typical dot screen pattern but where some or all dots are connected to each other with thin lines. Moreover, all types of lines and dots are possible, such as straight lines or somewhat curved lines, dots in the shape of circles, rhombus, etc.

The combination of the right type of pigments in the colour afterglowing layer as well as a screen pattern printed on top of this provides for a strong colour reproduction in both daylight and in the dark. The phosphorescent pigment(s) ensures for colour reproduction in the dark, however using only such pigments is difficult when to provide an optimal and clear colour in daylight. By mixing fluorescent pigment(s) into the colour afterglowing layer this layer is given a clearer colour in daylight. Moreover, by then also complementing this colour afterglowing layer with an outermost screen pattern the colour in daylight may be even further optimized. Moreover, the screen pattern does not cover the entire colour afterglowing layer, which in turn is very important to ensure that the colour afterglowing layer may be charged by light during the day to ensure colour afterglowing in the dark.

Furthermore, also the coverage of the screen pattern is of relevance according to the present invention. According to one embodiment of the present invention, the screen pattern is a coloured non-afterglowing screen pattern and has a coverage of maximum 80% of the total surface area of the colour afterglowing layer, preferably maximum 70% of the total surface area of the colour afterglowing layer, more preferably maximum 60% of the total surface area of the colour afterglowing layer, more preferably maximum 50% of the total surface area of the colour afterglowing layer, most preferably maximum 40% of the total surface area of the colour afterglowing layer. According to one specific embodiment, the coverage of the coloured non-afterglowing screen pattern is in a range of 35-55% of the total surface area of the colour afterglowing layer. This type of coverage level of the screen pattern is a preferred level according to the present invention when incorporating a screen pattern.

According to yet another embodiment of the present invention, the colour after glowing product, such as a sign, comprises symbols and/or text in one first afterglowing colour and a complementing signal field with a colour afterglowing layer in a different second afterglowing colour, and wherein the complementing signal field with a colour afterglowing layer in a second afterglowing colour is complemented with a coloured screen pattern with non-afterglowing colour complementing the second afterglowing colour. This type of sign is very suitable as a safety sign, warning sign, escape route sign or the like, or a type of notice sign. For instance, a sign with a red or green signal field and with white symbols and/or text is one example which is suitable. It should be noted that such white symbols may be provides with an afterglowing layer directly, i.e. without a screen pattern, whereas the signal field with a green or red afterglowing layer is then also complemented with a screen pattern with matching non-afterglowing colour. Furthermore, the signal field may be seen as the signalling colour background of a sign according to the present invention.

Moreover, according to yet another embodiment, one or several contour recesses are arranged around one or more symbols and/or text. Such contour recesses are arranged to ensure a more distinct shape of the symbols and text, especially in the dark. Furthermore, the one or more contour recesses may be arranged by ensuring a gap between the white afterglowing layer and the coloured afterglowing signal field. If a white sign material is provided in the rear, the one or more contour recesses are then also white in colour.

Furthermore, according to one embodiment of the present invention, the colour afterglowing product is a sign, preferably a safety sign or a warning sign or the like. The sign may e.g. be an emergency sign, escape route sign or the like.

Moreover, according to yet another embodiment of the present invention, the colour afterglowing sign also comprises a sign base material, preferably made of a self-adhesive material or which is complemented with an adhesive layer. This sign base material is the rear surface which may be white as mentioned above. Moreover, according to some examples, the sign base material is made of a metal, such as aluminium, plastic or a composite.

DETAILED DESCRIPTION OF THE DRAWINGS

FIG. 1 shows a schematic view of a possible escape route sign according to one embodiment of the present invention. In this case the sign comprises a signal field comprising a colour afterglowing layer with one colour, such as green, and where the symbols are printed with a white/yellowish (non-coloured) afterglowing material. It should be noted that the inherent features relating to the level of illuminance of the two different colour parts, also in combination to each other, are a key feature according to the present invention, although they are not possible to see from the figure as such.

Figure 2:
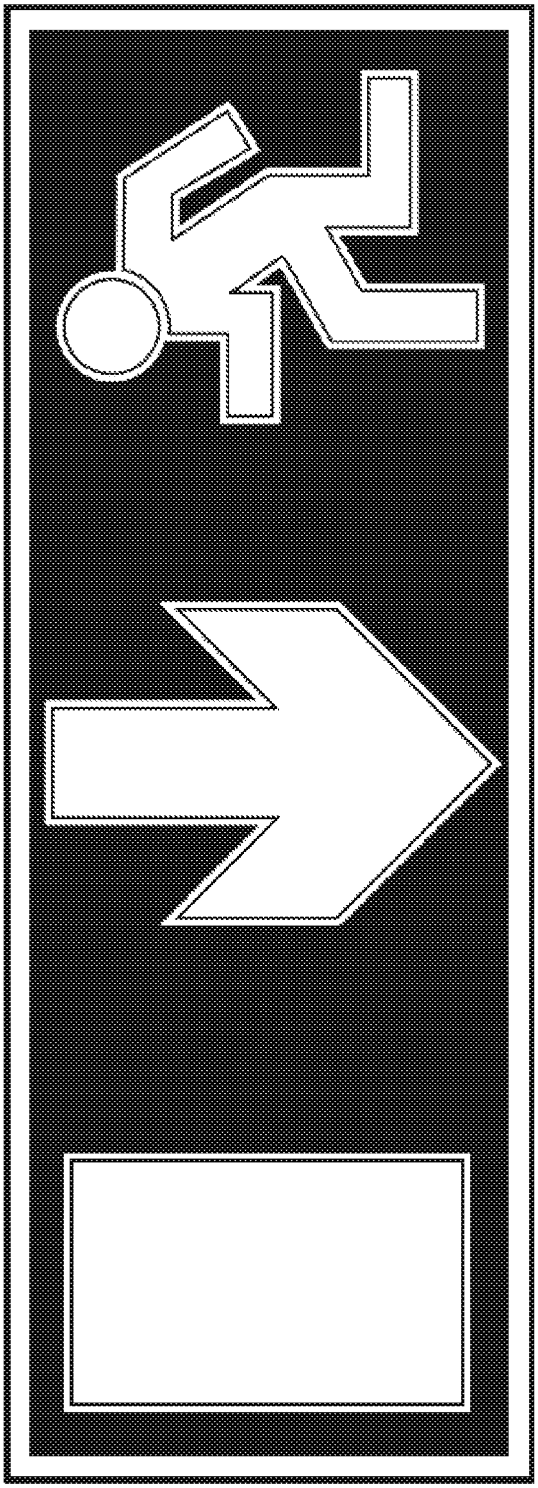
FIG. 2 shows another schematic view of a possible escape route sign according to one embodiment of the present invention.

FIG. 2 shows a similar sign as according to FIG. 1, however in this case there is also provided contour recesses around the symbols.

Figure 3:
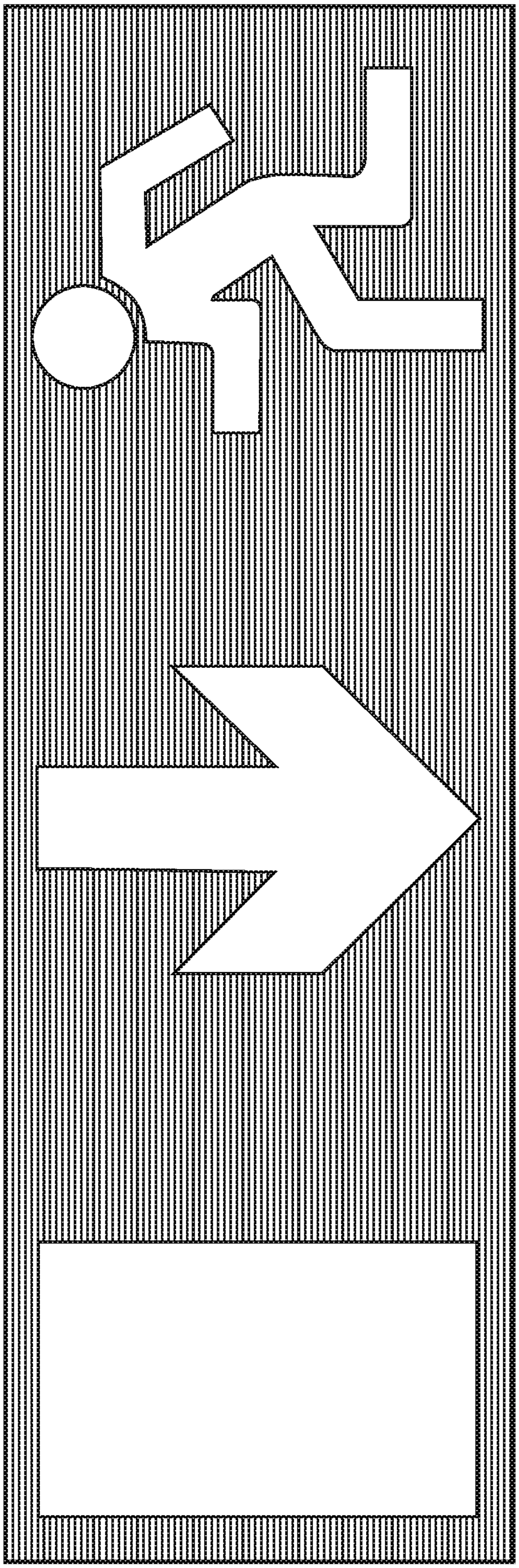
FIG. 3 shows yet another possible escape route sign according to one embodiment of the present invention.

FIG. 3 shows yet another possible escape route sign according to one embodiment of the present invention. In this case the colour afterglowing layer is complemented by a screen print pattern, in this case a line pattern, which is printed in colour(s) from a non-afterglowing colour system. The colour afterglowing layer comprises both phosphorescent pigment(s) and fluorescent pigment(s), such as stated according to some embodiments of the present invention and a second aspect of the present invention as explained below. The line screen print pattern is printed with a non-afterglowing green colour. Moreover, the white symbols comprise afterglowing material which is perceived as white in daylight and in the dark. The base material in the back may be a material with a white surface.

Testing of Some Signs According to the Present Invention

Two different signs according to the present invention where tested in accordance with the standard method ISO 16069:2017 and such decided testing parameters, and thus tested at 10/60 minutes. One sign comprising a sign base material was printed with a green afterglowing signal field, which then was complemented with a green non-afterglowing screen pattern. The symbols where printed with white/yellowish afterglowing material. When tested according to ISO 16069:2017 the obtained luminance values where 205/28 mcd/m$^2$ for the white/yellowish afterglowing material and 29.2/4.4 mcd/m$^2$ for the green afterglowing signal field, with ISO 16069:2017 testing parameters and at 10/60 minutes. It may also be noted that the green signal field had a non-afterglowing screen pattern which was green in accordance with the standard ISO 3864-4:2011.

The second printed sign according to the present invention was a sign in accordance with the above, however printed with a red signal field with a red afterglowing material complemented with a red non-afterglowing screen pattern. When tested according to ISO 16069:2017 the obtained luminance values where 205/28 mcd/m$^2$ for the white/yellowish afterglowing material, i.e. again in accordance with the above, and 8.0/1.2 mcd/m$^2$ for the red afterglowing signal field, with ISO 16069:2017 testing parameters and at 10/60 minutes.

A Second Aspect of the Present Invention

According to a second aspect of the present invention there is disclosed a colour afterglowing product, said colour afterglowing product being printed with a colour afterglowing layer comprising colour afterglowing pigment(s), wherein the colour afterglowing layer is complemented with a printed screen pattern, wherein the colour afterglowing layer comprises both phosphorescent pigment(s) and fluorescent pigment(s).

According to this second aspect, the combination of the right type of pigments in the colour afterglowing layer as well as a screen pattern printed on top of this provides for an optimal colour reproduction in both daylight and in the dark. The phosphorescent pigment(s) ensures for colour reproduction in the dark, however using only such pigments does normally not provide an optimal and clear colour in daylight. By mixing fluorescent pigment(s) into the colour afterglowing layer this layer is given a clearer colour in daylight. Moreover, by then also complementing this colour afterglowing layer with an outermost screen pattern the colour in daylight may be even further optimized. Moreover, the screen pattern does not cover the entire colour afterglowing layer, which in turn is very important to ensure that the colour afterglowing layer may be charged by light during the day to ensure colour afterglowing in the dark.

This aspect as well as e.g. optimal percentage of pigments in the colour afterglowing layer and yet other embodiments and features of the present invention are further disclosed below.

Brief Description of the Drawings

As mentioned, FIG. 3 shows an escape route sign according to one embodiment of the present invention.

Figure 4:
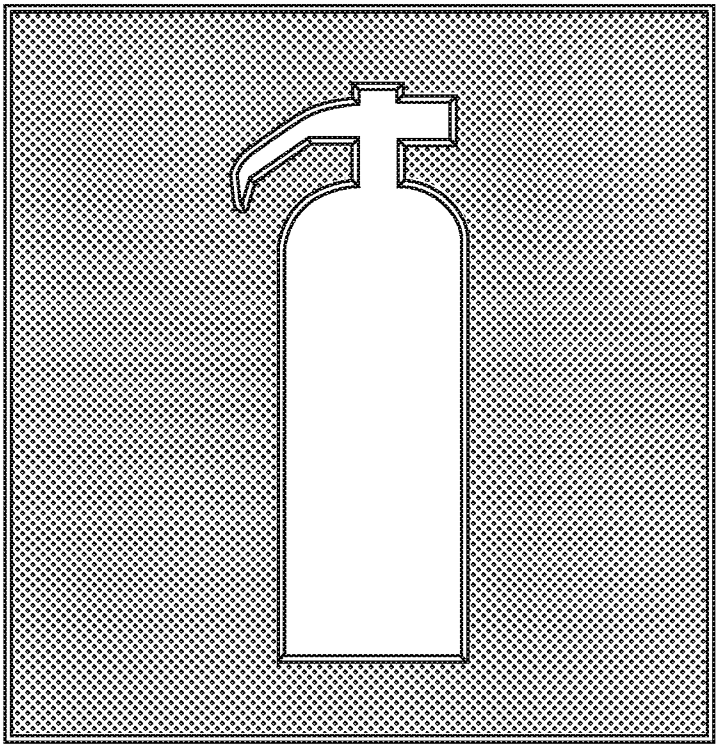
FIG. 4 shows another sign according to one embodiment of the present invention.

FIG. 4 shows another type of sign, in this case a notice/warning sign according to a similar embodiment of the present invention of that shown in FIG. 3.

Specific Embodiments of the Invention

Below there are provided further embodiments of the second aspect of the present invention.

According to one embodiment of the second aspect of the present invention, the amount of fluorescent pigment(s) is below 1.5 wt. %, calculated on the total weight of colour in the colour afterglowing layer. This low level of fluorescent pigments according to the present invention ensures that the phosphorescent pigment(s) are dominant, which is important to provide for colour afterglowing in the dark. Furthermore, the inclusion of fluorescent pigment(s) is still very relevant as this ensures a clearer colour in daylight. According to one specific embodiment, the amount of fluorescent pigment(s) is in the range of from 0.5 to below 1.5 wt. %, calculated on the total weight of colour in the colour afterglowing layer. The low level of fluorescent pigment(s) is also possible as the colour afterglowing layer is complemented with a printed screen pattern according to the present invention. It is this combination that provides for a clear colour in daylight as well as a strong colour reproduction in the dark. Moreover, by use a screen pattern less fluorescent pigment(s) are needed in the colour afterglowing layer, which in turn is beneficial in terms of the total need of special pigments in a product according to the present invention.

According to yet another specific embodiment, the screen pattern is a coloured non-afterglowing screen pattern, i.e. printed with non-afterglowing pigment(s) as an outermost non-afterglowing screen pattern. This combination, i.e. where the amount of fluorescent pigment(s) is below 1.5 wt. %, calculated on the total weight of colour in the colour afterglowing layer, and where this is complemented with a printed coloured non-afterglowing screen pattern is a preferred combination according to the present invention.

Furthermore, the screen pattern may be of different type according to the present invention. According to one embodiment of the second aspect of the present invention, the screen pattern is a coloured line screen pattern and/or a coloured dot screen pattern. It should be noted that all possible combinations here are possible according to the present invention. One example is a typical dot screen pattern but where some or all dots are connected to each other with thin lines. Moreover, all types of lines and dots are possible, such as straight lines or somewhat curved lines, dots in the shape of circles, rhombus, etc.

Furthermore, also the coverage of the screen pattern is of relevance according to the present invention. According to one embodiment of the second aspect of the present invention, the screen pattern is a coloured non-afterglowing screen pattern and has a coverage of maximum 80% of the total surface area of the colour afterglowing layer, preferably maximum 70% of the total surface area of the colour afterglowing layer, more preferably maximum 60% of the total surface area of the colour afterglowing layer, more preferably maximum 50% of the total surface area of the colour afterglowing layer, most preferably maximum 40% of the total surface area of the colour afterglowing layer. According to one specific embodiment, the coverage of the coloured non-afterglowing screen pattern is in a range of 35-55% of the total surface area of the colour afterglowing layer. This type of coverage level of the screen pattern is a preferred level according to the present invention.

Furthermore, also the amount level of the phosphorescent pigment(s) may be of relevance according to the present invention. According to one embodiment of the second aspect, the amount of phosphorescent pigment(s) is in the range of 30-80 wt. %, preferably in the range of 40-70 wt. %, more preferably in the range of 45-65 wt. %, calculated on the total weight of colour in the colour afterglowing layer. As should be understood, this level should be much higher than the amount level of fluorescent pigment(s), as the phosphorescent pigment(s) ensure for a high degree of colour afterglowing in the dark.

According to one embodiment of the second aspect of the present invention, the colour afterglowing product is a sign, preferably a safety sign or a warning sign or the like. The sign may e.g. be an emergency sign, escape route sign or the like.

According to yet another embodiment, the colour after glowing product, such as a sign, comprises symbols and/or text in one first afterglowing colour and a complementing signal field with a colour afterglowing layer in a different second afterglowing colour, and wherein the complementing signal field with a colour afterglowing layer in a second afterglowing colour is complemented with a coloured screen pattern with non-afterglowing colour complementing the second afterglowing colour. This type of sign is very suitable as a safety sign, warning sign, escape route sign or the like, or a type of notice sign. For instance, a sign with a red or green signal field and with white symbols and/or text is one example which is suitable. It should be noted that such white symbols may be provides with an afterglowing layer directly, i.e. without a screen pattern, whereas the signal field with a green or red afterglowing layer is then also complemented with a screen pattern with matching non-afterglowing colour. Furthermore, the signal field may be seen as the signalling colour background of a sign according to the present invention.

The present invention provides colour afterglowing products, such as signs, which provides an optimal effect of colour reproduction in daylight as well as in the dark. This is obtained by providing a high luminance effect of the signal field from the colour afterglowing material, but still with the correct colour effect in daylight (right level of fluorescent pigments as well as the correct perceived colour). Moreover, also the combined effect of the luminance level of the white/yellowish afterglowing symbols also play a role in this. The combined effect of the two different colour afterglowing spaces of a sign interact to ensure an optimal effect in the dark. This also implies that a too high level of luminance of the white/yellowish symbol could affect the reproduction of the colour of the signal field in the dark in a somewhat negative way. In relation to the above it may be mentioned that the white/yellowish afterglowing parts may also be referred to as non-coloured afterglowing parts, that is they are afterglowing in a white colour in the dark.

In accordance with the above, according to one embodiment of the second aspect of the present invention, the signal field with a colour afterglowing layer in a second afterglowing colour complemented with a coloured screen pattern with non-afterglowing colour complementing the second afterglowing colour has a minimum luminance of 4/0.5 mcd/$m^2$ when measured in accordance with ISO 16069:2017 testing parameters and at 10/60 minutes, preferably a minimum luminance of 6/0.75 mcd/$m^2$, most preferably a minimum luminance of 7.5/1.0 mcd/$m^2$, when measured in accordance with ISO 16069:2017 testing parameters and at 10/60 minutes.

Moreover, according to yet another embodiment, the signal field with a colour afterglowing layer in a second afterglowing colour complemented with a coloured screen pattern with non-afterglowing colour complementing the second afterglowing colour has a minimum luminance of 7.5/1.0 mcd/$m^2$, when measured in accordance with ISO 16069:2017 testing parameters and at 10/60 minutes, and has a red colour, preferably a red colour corresponding to the standard ISO 3864-4:2011 with reference to chromaticity coordinates and luminance factor for object colours of ordinary materials, phosphorescent materials and unpowered internally illuminated safety signs under external illumination. This embodiment is directed towards obtaining a high colour luminance as well as a correct red colour reproduction also in daylight.

According to yet another specific embodiment of the second aspect of the present invention, the signal field with a colour afterglowing layer in a second afterglowing colour complemented with a coloured screen pattern with non-afterglowing colour complementing the second afterglowing colour has a minimum luminance of 15/2.0 mcd/$m^2$, preferably a minimum luminance of 25/3.0 mcd/$m^2$ when measured in accordance with ISO 16069:2017 testing parameters and at 10/60 minutes, and has a green colour, preferably a green colour corresponding to the standard ISO 3864-4:2011 with reference to chromaticity coordinates and luminance factor for object colours of ordinary materials, phosphorescent materials and unpowered internally illuminated safety signs under external illumination. As should be understood, this embodiment is directed towards a green afterglowing signal field with a correct green colour also in daylight.

As mentioned, also the luminance of the white/yellow (uncoloured) afterglowing symbols are important, also for the entire effect of the colour afterglowing product according to the present invention. According to one embodiment of the present invention, the symbols and/or text in one first afterglowing colour comprises white/yellowish afterglowing pigments (material) and has a minimum luminance of 140/20 mcd/$m^2$, preferably a minimum luminance of 160/20 mcd/$m^2$, more preferably a minimum luminance of 190/25 mcd/$m^2$, most preferably a luminance in the range of (190/25-350/50) mcd/$m^2$, when measured in accordance with ISO 16069:2017 testing parameters and at 10/60 minutes. The most preferred range also with a maximum luminance is provided as a too high luminance in the non-coloured afterglowing material may have a negative effect on the colour afterglowing of the signal field.

According to one preferred embodiment, the signal field with a colour afterglowing layer in a second afterglowing colour complemented with a coloured screen pattern with non-afterglowing colour complementing the second afterglowing colour has a minimum luminance of 4/0.5 mcd/$m^2$ when measured in accordance with ISO 16069:2017 testing parameters and at 10/60 minutes, preferably a minimum luminance of 6/0.75 mcd/$m^2$, most preferably a minimum luminance of 7.5/1.0 mcd/$m^2$, when measured in accordance with ISO 16069:2017 testing parameters and at 10/60 minutes, and wherein the symbols and/or text in one first afterglowing colour comprises white/yellowish afterglowing pigments and has a minimum luminance of 140/20 mcd/$m^2$, preferably a minimum luminance of 160/20 mcd/$m^2$, more preferably a minimum luminance of 190/25 mcd/$m^2$, most preferably a luminance in the range of (190/25-350/50) mcd/$m^2$, when measured in accordance with ISO 16069:2017 testing parameters and at 10/60 minutes.

As said, also the colour in daylight is of importance. The present invention provides products, such as signs, which also meets the suitable standards for colour reproduction of non-coloured afterglowing signs. In accordance with this, according to one embodiment, the complementing signal field with a colour afterglowing layer in a second afterglowing colour complemented with a coloured screen pattern with non-afterglowing colour complementing the second afterglowing colour has a colour corresponding to the standard ISO 3864-4:2011 with reference to chromaticity coordinates and luminance factor for object colours of ordinary materials, phosphorescent materials and unpowered internally illuminated safety signs under external illumination, for the specific chosen colour(s) of the complementing signal field, preferably being a green or a red colour.

Moreover, according to yet another embodiment, one or several contour recesses are arranged around one or more symbols and/or text. Such contour recesses are arranged to ensure a more distinct shape of the symbols and text, especially in the dark. Furthermore, the one or more contour recesses may be arranged by ensuring a gap between the white afterglowing layer and the coloured afterglowing signal field. If a white sign material is provided in the rear, the one or more contour recesses are then also white in colour.

Furthermore, according to yet another embodiment of the present invention, the colour afterglowing sign also comprises a sign base material, preferably made of a self-adhesive material or which is complemented with an adhesive layer. This sign base material is the rear surface which may be white as mentioned above. Moreover, according to some examples, the sign base material is made of a metal, such as aluminium, plastic or a composite.

Detailed Description of the Drawings

As hinted above, FIG. 3 shows an escape route sign according to one embodiment of the present invention, both in relation to the first and second aspect of the present invention. In this case the colour afterglowing layer is complemented by a screen print pattern, in this case a line pattern, which is printed in colour(s) from a non-afterglowing colour system. The colour afterglowing layer comprises both phosphorescent pigment(s) and fluorescent pigment(s), such as stated according to the second aspect of the present invention. The line screen print pattern is printed with a non-afterglowing green colour. Moreover, the white symbols comprise afterglowing material which is perceived as white in daylight and in the dark. The base material in the back may be a material with a white surface.

FIG. 4 shows another type of sign, in this case a notice/warning sign according to a similar embodiment of the present invention of that shown in FIG. 3. In this case a dot screen print pattern is used instead of a line screen print pattern. In this connection it should be stated that screen print patterns may be created with in principle any shapes, such as crosses, stars, etc. Furthermore, a notice/warning sign according to FIG. 3 suitably has a red signal field/background made of a red afterglowing layer comprising both phosphorescent pigment(s) and fluorescent pigment(s), then a dot screen pattern printed with red non-afterglowing material and finally a white symbol printed with white afterglowing material. Furthermore, in this case there is also provided a contour recess around the symbol so that the symbol is clearer when viewed in the dark.

Testing of Some Signs According to the Present Invention

Two different signs according to the second aspect of the present invention where tested in accordance with the standard method ISO 16069:2017 and such decided testing parameters, and thus tested at 10/60 minutes. One sign comprising a sign base material was printed with a green afterglowing signal field, which then was complemented with a green non-afterglowing screen pattern. The symbols where printed with white/yellowish afterglowing material. When tested according to ISO 16069:2017 the obtained luminance values where 205/28 mcd/$m^2$ for the white/yellowish afterglowing material and 29.2/4.4 mcd/$m^2$ for the green afterglowing signal field, with ISO 16069:2017 testing parameters and at 10/60 minutes. It may also be noted that the green signal field had a non-afterglowing screen pattern which was green in accordance with the standard ISO 3864-4:2011.

The second printed sign according to a second aspect of the present invention was a sign in accordance with the above, however printed with a red signal field with a red afterglowing material complemented with a red non-afterglowing screen pattern. When tested according to ISO 16069:2017 the obtained luminance values where 205/28 mcd/$m^2$ for the white/yellowish afterglowing material, i.e. again in accordance with the above, and 8.0/1.2 mcd/$m^2$ for the red afterglowing signal field, with ISO 16069:2017 testing parameters and at 10/60 minutes.

Clauses—a Second Aspect of the Present Invention

1. A colour afterglowing product, said colour afterglowing product being printed with a colour afterglowing layer comprising colour afterglowing pigment(s), wherein the colour afterglowing layer is complemented with a printed screen pattern, wherein the colour afterglowing layer comprises both phosphorescent pigment(s) and fluorescent pigment(s).
2. The colour afterglowing product according to claim 1, wherein the amount of fluorescent pigment(s) is below 1.5 wt. % calculated on the total weight of colour in the colour afterglowing layer, preferably the amount of fluorescent pigment(s) is in the range of from 0.5 to below 1.5 wt. %, calculated on the total weight of colour in the colour afterglowing layer.
3. The colour afterglowing product according to claim 1 or 2, wherein the screen pattern is a coloured non-afterglowing screen pattern.
4. The colour afterglowing product according to any of claims 1-3, wherein the screen pattern is a coloured line screen pattern and/or a coloured dot screen pattern.
5. The colour afterglowing product according to any of claims 1-4, wherein the screen pattern is a coloured non-afterglowing screen pattern and has a coverage of maximum 80% of the total surface area of the colour afterglowing layer, preferably maximum 70% of the total surface area of the colour afterglowing layer, more preferably maximum 60% of the total surface area of the colour afterglowing layer, more preferably maximum 50% of the total surface area of the colour afterglowing layer, most preferably maximum 40% of the total surface area of the colour afterglowing layer.
6. The colour afterglowing product according to any of claims 1-5, wherein the amount of phosphorescent pigment(s) is in the range of 30-80 wt. %, preferably in the range of 40-70 wt. %, more preferably in the range of 45-65 wt. %, calculated on the total weight of colour in the colour afterglowing layer.
7. The colour afterglowing product according to any of claim 1-6, wherein the colour afterglowing product, such as a sign, comprises symbols and/or text in one first afterglowing colour and a complementing signal field with a colour afterglowing layer in a different second afterglowing colour, and wherein the complementing signal field with a colour afterglowing layer in a second afterglowing colour is complemented with a coloured screen pattern with non-afterglowing colour complementing the second afterglowing colour.
8. The colour afterglowing product according to claim 7, wherein the complementing signal field with a colour afterglowing layer in a second afterglowing colour complemented with a coloured screen pattern with non-afterglowing colour complementing the second afterglowing colour has a minimum luminance of 4/0.5 mcd/$m^2$ when measured in accordance with ISO 16069:2017 testing parameters and at 10/60 minutes, preferably a minimum luminance of 6/0.75 mcd/$m^2$, most preferably a minimum luminance of 7.5/1.0 mcd/$m^2$, when measured in accordance with ISO 16069:2017 testing parameters and at 10/60 minutes.
9. The colour afterglowing product according to claim 7 or 8, wherein the complementing signal field with a colour afterglowing layer in a second afterglowing colour complemented with a coloured screen pattern with non-afterglowing colour complementing the second afterglowing colour has a minimum luminance of 7.5/1.0 mcd/$m^2$, when measured in accordance with ISO 16069:2017 testing parameters and at 10/60 minutes, and has a red colour, preferably a red colour corresponding to the standard ISO 3864-4:2011 with reference to chromaticity coordinates and luminance factor for object colours of ordinary materials, phosphorescent materials and unpowered internally illuminated safety signs under external illumination.
10. The colour afterglowing product according to claim 7 or 8, wherein the complementing signal field with a colour afterglowing layer in a second afterglowing colour complemented with a coloured screen pattern with non-afterglowing colour complementing the second afterglowing colour has a minimum luminance of 15/2.0 mcd/m$^2$, preferably a minimum luminance of 25/3.0 mcd/m$^2$ when measured in accordance with ISO 16069:2017 testing parameters and at 10/60 minutes, and has a green colour, preferably a green colour corresponding to the standard ISO 3864-4:2011 with reference to chromaticity coordinates and luminance factor for object colours of ordinary materials, phosphorescent materials and unpowered internally illuminated safety signs under external illumination.

11. The colour afterglowing product according to any of claims 7-10, wherein the symbols and/or text in one first afterglowing colour comprises white/yellowish afterglowing pigments and has a minimum luminance of 140/20 mcd/m$^2$, preferably a minimum luminance of 160/20 mcd/m$^2$, more preferably a minimum luminance of 190/25 mcd/m$^2$, most preferably a luminance in the range of (190/25-350/50) mcd/m$^2$, when measured in accordance with ISO 16069:2017 testing parameters and at 10/60 minutes.

12. The colour afterglowing product according to any of claims 7-11, wherein the complementing signal field with a colour afterglowing layer in a second afterglowing colour complemented with a coloured screen pattern with non-afterglowing colour complementing the second afterglowing colour has a minimum luminance of 4/0.5 mcd/m$^2$ when measured in accordance with ISO 16069:2017 testing parameters and at 10/60 minutes, preferably a minimum luminance of 6/0.75 mcd/m$^2$, most preferably a minimum luminance of 7.5/1.0 mcd/m$^2$, when measured in accordance with ISO 16069:2017 testing parameters and at 10/60 minutes, and wherein the symbols and/or text in one first afterglowing colour comprises white/yellowish afterglowing pigments and has a minimum luminance of 140/20 mcd/m$^2$, preferably a minimum luminance of 160/20 mcd/m$^2$, more preferably a minimum luminance of 190/25 mcd/m$^2$, most preferably a luminance in the range of (190/25-350/50) mcd/m$^2$, when measured in accordance with ISO 16069:2017 testing parameters and at 10/60 minutes.

13. The colour afterglowing product according to any of claims 7-12, wherein the complementing signal field with a colour afterglowing layer in a second afterglowing colour complemented with a coloured screen pattern with non-afterglowing colour complementing the second afterglowing colour has a colour corresponding to the standard ISO 3864-4:2011 with reference to chromaticity coordinates and luminance factor for object colours of ordinary materials, phosphorescent materials and unpowered internally illuminated safety signs under external illumination, for the specific chosen colour(s) of the complementing signal field, preferably being a green or a red colour.

14. The colour afterglowing product according to any of claims 7-13, wherein one or several contour recesses are arranged around one or more symbols and/or text.

15. The colour afterglowing product according to any of claims 1-14, wherein the colour afterglowing product is a sign, preferably a safety sign or a warning sign.

16. The colour afterglowing product according to claim 15, also comprising a sign base material, preferably made of a self-adhesive material or which is complemented with an adhesive layer.

The invention claimed is:

1. A colour afterglowing product, said colour afterglowing product being printed with a colour afterglowing layer comprising colour afterglowing pigment(s), wherein the colour afterglowing product comprises symbols and/or text in one first afterglowing colour and a complementing signal field with a colour afterglowing layer in a different second afterglowing colour, wherein the complementing signal field with a colour afterglowing layer in a second afterglowing colour has a minimum luminance of 4/0.5 mcd/m$^2$ when measured in accordance with ISO 16069:2017 testing parameters and at 10/60 minutes, wherein the symbols and/or text in one first afterglowing colour comprises white/yellowish afterglowing pigments and has a minimum luminance of 140/20 mcd/m$^2$ when measured in accordance with ISO 16069:2017 testing parameters and at 10/60 minutes, wherein the amount of phosphorescent pigment(s) in the colour afterglowing layer of the complementing signal field is in the range of 30-80 wt. %, calculated on the total weight of colour in the colour afterglowing layer, and wherein the complementing signal field with a colour afterglowing layer in a different second afterglowing colour is complemented with a coloured screen pattern complementing the second afterglowing colour.

2. The colour afterglowing product according to claim 1, wherein the symbols and/or text in one first afterglowing colour comprises white/yellowish afterglowing pigments and has a minimum luminance of 160/20 mcd/m$^2$ when measured in accordance with ISO 16069:2017 testing parameters and at 10/60 minutes.

3. The colour afterglowing product according to claim 1, wherein the complementing signal field with a colour afterglowing layer in a second afterglowing colour has a colour corresponding to the standard ISO 3864-4:2011 with reference to chromaticity coordinates and luminance factor for object colours of ordinary materials, phosphorescent materials and unpowered internally illuminated safety signs under external illumination, for the specific chosen colour(s) of the complementing signal field.

4. The colour afterglowing product according to claim 1, wherein the complementing signal field with a colour afterglowing layer in a second afterglowing colour has a minimum luminance of 7.5/1.0 mcd/m$^2$, when measured in accordance with ISO 16069:2017 testing parameters and at 10/60 minutes, and has a red colour corresponding to the standard ISO 3864-4:2011 with reference to chromaticity coordinates and luminance factor for object colours of ordinary materials, phosphorescent materials and unpowered internally illuminated safety signs under external illumination.

5. The colour afterglowing product according to claim 1, wherein the complementing signal field with a colour afterglowing layer in a second afterglowing colour has a minimum luminance of 15/2.0 mcd/m$^2$.

6. The colour afterglowing product according to claim 1, wherein the complementing signal field with a colour afterglowing layer in a second afterglowing colour has a minimum luminance of 4/0.5 mcd/m$^2$ when measured in accordance with ISO 16069:2017 testing parameters and at 10/60 minutes, and wherein the symbols and/or text in one first afterglowing colour comprises white/yellowish afterglowing pigments and has a minimum luminance of 140/20 mcd/m$^2$, when measured in accordance with ISO 16069:2017 testing parameters and at 10/60 minutes.

7. The colour afterglowing product according to claim 1, wherein the amount of phosphorescent pigment(s) in the colour afterglowing layer of the complementing signal field is in the range of 40-70 wt. %.

8. The colour afterglowing product according to claim 1, wherein the amount of fluorescent pigment(s) in the colour afterglowing layer of the complementing signal field is below 1.5 wt. %.

9. The colour afterglowing product according to claim 1, wherein the coloured screen pattern has a non-afterglowing colour complementing the second afterglowing colour, so that the complementing signal field has a colour corresponding to the standard ISO 3864-4:2011 with reference to chromaticity coordinates and luminance factor for object colours of ordinary materials, phosphorescent materials and unpowered internally illuminated safety signs under external illumination, for the specific chosen colour(s) of the complementing signal field.

10. The colour afterglowing product according to claim 9, wherein the screen pattern is a coloured line screen pattern and/or a coloured dot screen pattern.

11. The colour afterglowing product according to claim 9, wherein the screen pattern is a coloured non-afterglowing screen pattern and has a coverage of maximum 80% of the total surface area of the colour afterglowing layer.

12. The colour afterglowing product according to claim 1, wherein one or several contour recesses are arranged around one or more symbols and/or text.

13. The colour afterglowing product according to claim 1, wherein the colour afterglowing product is a sign.

14. The colour afterglowing product according to claim 13, also comprising a sign base material.

15. The colour afterglowing product according to claim 1, wherein the complementing signal field with a colour afterglowing layer in a second afterglowing colour has a minimum luminance of 6/0.75 mcd/$m^2$ when measured in accordance with ISO 16069:2017 testing parameters and at 10/60 minutes.

16. The colour afterglowing product according to claim 1, wherein the complementing signal field with a colour afterglowing layer in a second afterglowing colour has a minimum luminance of 7.5/1.0 mcd/$m^2$ when measured in accordance with ISO 16069:2017 testing parameters and at 10/60 minutes.

17. The colour afterglowing product according to claim 1, wherein the symbols and/or text in one first afterglowing colour comprises white/yellowish afterglowing pigments and has a minimum luminance of 190/25 mcd/$m^2$, when measured in accordance with ISO 16069:2017 testing parameters and at 10/60 minutes.

18. The colour afterglowing product according to claim 1, wherein the complementing signal field with a colour afterglowing layer in a second afterglowing colour has a minimum luminance of 25/3.0 mcd/$m^2$ when measured in accordance with ISO 16069:2017 testing parameters and at 10/60 minutes, and has a green colour corresponding to the standard ISO 3864-4:2011 with reference to chromaticity coordinates and luminance factor for object colours of ordinary materials, phosphorescent materials and unpowered internally illuminated safety signs under external illumination.

19. The colour afterglowing product according to claim 1, wherein the complementing signal field with a colour afterglowing layer in a second afterglowing colour has a minimum luminance of 7.5/1.0 mcd/$m^2$, when measured in accordance with ISO 16069:2017 testing parameters and at 10/60 minutes, and wherein the symbols and/or text in one first afterglowing colour comprises white/yellowish afterglowing pigments and has a minimum luminance of 190/25 mcd/$m^2$, when measured in accordance with ISO 16069:2017 testing parameters and at 10/60 minutes.

20. The colour afterglowing product according to claim 1, wherein the amount of phosphorescent pigment(s) in the colour afterglowing layer of the complementing signal field is in the range of 45-65 wt. %, calculated on the total weight of colour in the colour afterglowing layer.

21. The colour afterglowing product according to claim 1, wherein the colour afterglowing layer of the complementing signal field comprises both phosphorescent pigment(s) and fluorescent pigment(s).

* * * * *